(12) United States Patent
Chen et al.

(10) Patent No.: US 10,261,240 B2
(45) Date of Patent: Apr. 16, 2019

(54) BACKLIGHT MODULE AND LIQUID CRYSTAL DISPLAY

(71) Applicant: WUHAN CHINA STAR OPTOELECTRONICS TECHNOLOGY CO., LTD., Wuhan, Hubei (CN)

(72) Inventors: Qian Chen, Guangdong (CN); Shih-hsiang Chen, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 239 days.

(21) Appl. No.: 15/038,722

(22) PCT Filed: Apr. 21, 2016

(86) PCT No.: PCT/CN2016/079807
§ 371 (c)(1),
(2) Date: May 23, 2016

(87) PCT Pub. No.: WO2017/173673
PCT Pub. Date: Oct. 12, 2017

(65) Prior Publication Data
US 2018/0088272 A1 Mar. 29, 2018

(30) Foreign Application Priority Data
Apr. 6, 2016 (CN) .......................... 2016 1 0209041

(51) Int. Cl.
*F21V 8/00* (2006.01)
*G02B 6/00* (2006.01)
*G02F 1/1335* (2006.01)

(52) U.S. Cl.
CPC ............. *G02B 6/0091* (2013.01); *G02B 6/00* (2013.01); *G02B 6/0055* (2013.01);
(Continued)

(58) Field of Classification Search
CPC ..................................................... G02B 6/0078
See application file for complete search history.

(56) References Cited

U.S. PATENT DOCUMENTS

2004/0095522 A1* 5/2004 Lee ....................... G02B 6/0038
349/61
2008/0285310 A1* 11/2008 Aylward ................ G02B 6/001
362/626
(Continued)

FOREIGN PATENT DOCUMENTS

| CN | 201651946 U | 11/2010 |
| CN | 102109633 A | 6/2011 |

(Continued)

*Primary Examiner* — Anh T Mai
*Assistant Examiner* — Zachary J Snyder
(74) *Attorney, Agent, or Firm* — Andrew C. Cheng

(57) ABSTRACT

A backlight module includes a light guide plate including a light incident surface having first and second light incident sections and a light propagation track that extends from the first light incident section into the light guide plate and delimits a light propagation path and is formed with an opening. A light bar includes first and second light sources respectively corresponding to the first and second light incident sections to allow light to enter the light propagation path to be reflected by the light propagation track for outward emission and allow light to enter the light guide plate for outward emission from the light emission surface. A control circuit is electrically connected to the first light source and the second light source for controlling ON/OFF states of the first light source and the second light source thereby allowing for displaying in a sectionized fashion.

18 Claims, 5 Drawing Sheets

(52) U.S. Cl.
CPC ......... *G02B 6/0068* (2013.01); *G02B 6/0078* (2013.01); *G02B 6/0083* (2013.01); *G02F 1/133512* (2013.01)

(56) References Cited

U.S. PATENT DOCUMENTS

2011/0102407 A1* 5/2011 Cho .................. G02F 1/133308
  345/211
2012/0019742 A1   1/2012 Chang

FOREIGN PATENT DOCUMENTS

| CN | 202141827 U | 2/2012 |
| CN | 102486275 A | 6/2012 |
| CN | 103941326 A | 7/2014 |
| CN | 203980009 U | 12/2014 |
| CN | 104597556 A | 5/2015 |
| TW | 200408875 A | 6/2004 |

\* cited by examiner

BACKLIGHT MODULE AND LIQUID CRYSTAL DISPLAY

CROSS REFERENCE TO RELATED APPLICATIONS

This application claims the priority of Chinese Patent Application No. 201610209041.0 filed on Apr. 6, 2016, titled "Backlight Module and Liquid Crystal Display", the disclosure of which is incorporated herein by reference in its entirety.

BACKGROUND OF THE INVENTION

1. Field of the Invention

The present invention relates to the field of backlighting display technology, and more particularly to a backlight module and a liquid crystal display that uses the backlight module.

2. The Related Arts

Liquid crystal displays have various advantages, such as small size, low power consumption, and being free of radiation, and has made great progress in respect of screen size and displaying quality, making them the main stream product in the market in all aspects including mobile phones, computer monitors, and televisions.

Most of the liquid crystal displays available in the market are backlighting liquid crystal displays, which comprise a liquid crystal display panel and a backlight module. Since the liquid crystal display panel is not luminous by itself, lighting must be provided from the backlight module for normal displaying of images.

Heretofore, image displaying made on a conventional liquid crystal display is generally conducted on the entirety of a screen. In other words, the entire light exit surface of the backlight module simultaneously emits light. For application of the liquid crystal displays in display devices, such as mobile phones and computers, it needs to light the entire screen to achieve desired displaying even if there is just one message to be read. Under this condition, the emission of light from the entire backlight module would increase the power consumption of the display device, leading to greatly shortening of the available service hours of the battery of the display device. Further, frequent charging/discharging would also cause shortening of the service life of the battery of the entire device and speeding up the aging rate of the display device.

SUMMARY OF THE INVENTION

The technical issue to be addressed by the present invention is to provide a backlight module, which allows for sectionized displaying and a liquid crystal display using the backlight module.

To achieve the above object, the present invention adopts the following technical solutions:

In an aspect, a backlight module is provided, comprising:
a light guide plate, which comprises a light incident surface and a light emission surface and also a light propagation track, the light incident surface comprising a first light incident section and a second light incident section adjacent to each other, the light propagation track extending from the first light incident section into interior of the light guide plate and circumferentially enclosing and delimiting a light propagation path, the light propagation track being formed with an opening facing the light emission surface;

a light bar, which comprises a first light source and a second light source, the first light source corresponding exactly to the first light incident section to allow light from the first light source to enter the light propagation path to be reflected by the light propagation track for subsequent outward emission, sequentially through the opening and the light emission surface, the second light source corresponding exactly to the second light incident section to allow light from the second light source to enter the light guide plate for subsequent outward emission from the light emission surface; and a control circuit, which is electrically connected to the first light source and the second light source for controlling ON/OFF states of the first light source and the second light source.

In the above backlight module, the light propagation track has one side facing the light propagation path and provided with a reflector plate or a reflective coating layer for reflecting light in the light propagation path.

In the above backlight module, the light propagation path is filled with air or a light guide material.

In the above backlight module, the light propagation path is filled with a light guide material and the light propagation track has a side facing the light propagation path and provided with an air layer, which conducts total reflection of light in the light propagation path.

In the above backlight module, the light propagation track has a cross-sectional configuration that is in the form of a U-shaped, a V-shaped, a semicircle or a channel.

In the above backlight module, the first light incident section is provided with a light guide structure for guiding light toward the light propagation track.

In the above backlight module, the first light incident section and the second light incident section define therebetween an angle that is less than 120°.

In the above backlight module, the first light source has a light projection surface that is arranged parallel to the first light incident section to increase percentage of light getting into the first light incident section from the first light source.

In the above backlight module, the first light source comprises at least one first sub light source and the second light source comprises at least two second sub light sources, the first sub light sources having a package size smaller than a package size of the second sub light sources so that light intensity of the first light incident section is less than light intensity of the second light incident section.

In another aspect, a liquid crystal display is provided, comprising the backlight module as described above.

Compared to the prior art, the present invention offers the following advantages:

In an embodiment of the present invention, the backlight module provides flexible control of states of brightening or darkening of the first light source and the second light source individually by means of the control circuit. Further, the light from the first light source enters the light propagation path to be reflected by the light propagation track for subsequent outward emission, sequentially through the opening and the light emission surface (wherein the area in which the outward emission is conducted is defined as a first light emission section); and light from the second light source enters the light guide plate for subsequent outward emission from the light emission surface (wherein the area in which the outward emission is conducted in defined as a second light emission section), whereby the light emission surface of the light guide plate may achieve sectionized light emission and the light guide plate allows for optional light emission from the first light emission section and/or the second light emission section. Since the light guide plate allows for sectionized light emission, the backlight module may adopt different light emission modes according to actual needs, such that the backlight module may select a localized partial light emission mode or a global complete light emission mode, whereby the application of the backlight module is made more flexible and allows for reduction of energy consumption and thus extension of the life span of the backlight module.

Further, the backlight module of the instant embodiment is provided with the light propagation track and the light propagation track circumferentially encloses and delimits the light propagation path and the light propagation track is formed with the opening that faces the light emission surface, a major fraction of the light entering the first light incident section propagates in and through the light propagation path for outward emission, by way of the opening of the light propagation track, from the first light emission section. In other words, the major fraction of the light entering the first light incident section is guided to propagate in a predetermined direction (which is a direction of extension of the light propagation track) thereby reducing the percentage of escaping light and increasing light intensity in an area where the light propagation track extends through, meaning brightness of exit light from the first light emission section is increased.

BRIEF DESCRIPTION OF THE DRAWINGS

To more clearly explain the technical solution proposed in the present invention, a brief description of the drawings that are necessary for embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution of an embodiment of the present invention with reference to the attached drawings of the embodiment of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
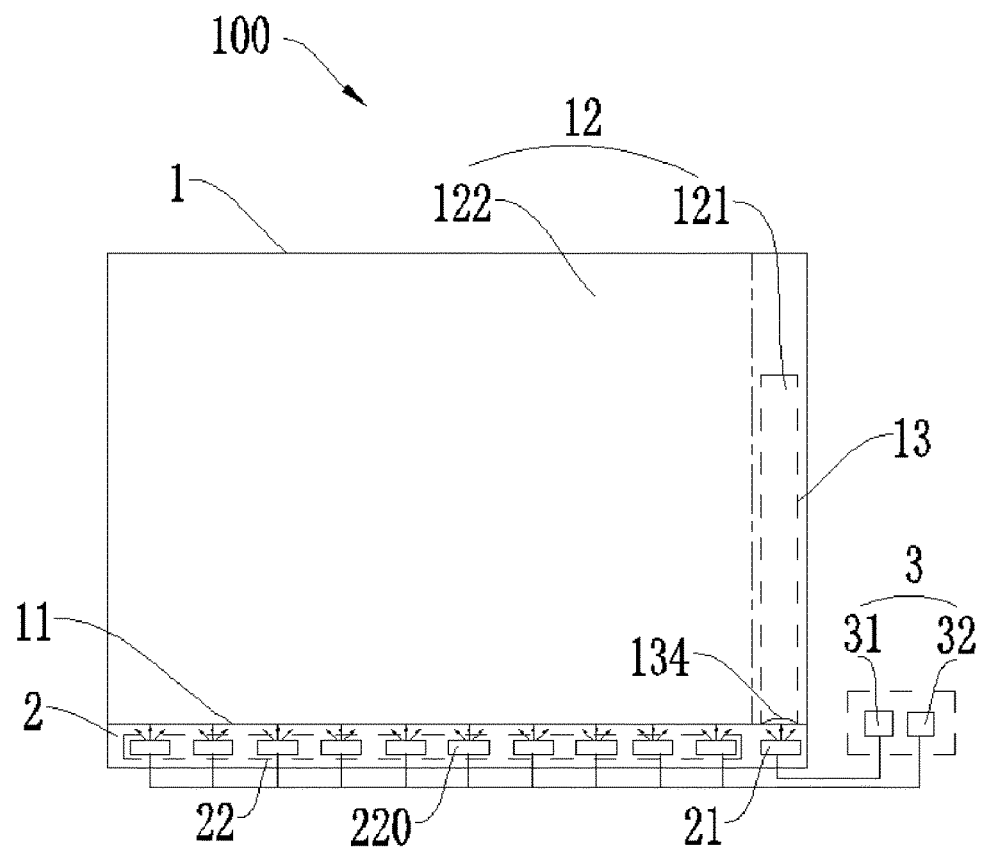
FIG. 1 is a schematic view illustrating a backlight module provided according to an embodiment of the present invention.
Figure 2:
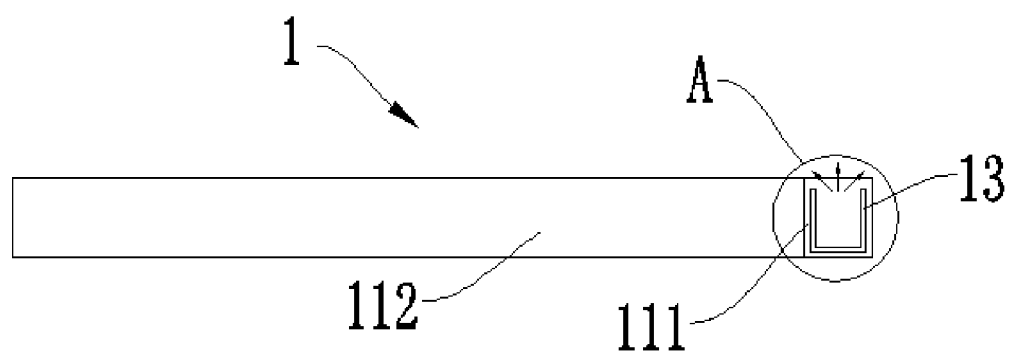
FIG. 2 is a schematic view illustrating a liquid guide plate of the backlight module provided according to the embodiment of the present invention.
Figure 3:
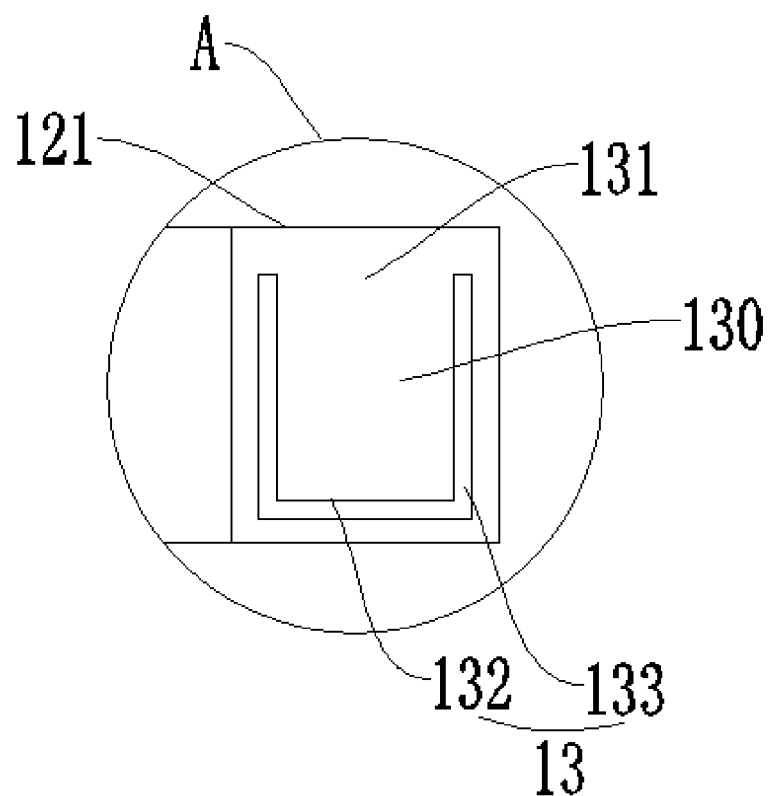
FIG. 3 is an enlarged view of circled portion A of FIG. 2.

Referring FIGS. 1-3, an embodiment of the present invention provides a backlight module 100, which comprises a light guide plate 1 and a light bar 2 and also a control circuit 3. The light guide plate 1 comprises a light incident surface 11, a light emission surface 12, and a light propagation track 13. The light incident surface 11 comprises a first light incident section 111 and a second light incident section 112 that are adjacent to each other. The light propagation track 13 extends from the first light incident section 111 into interior of the light guide plate 1. The light propagation track 13 circumferentially encloses and delimits a light propagation path 130 and the light propagation track 13 is formed with an opening 131 facing the light emission surface 12. The light bar 2 comprises a first light source 21 and a second light source 22. The first light source 21 corresponds exactly to the first light incident section 111 so that light from the first light source 21 is allowed to enter the light propagation path 130 to be reflected by the light propagation track 13 for subsequent outward emission, sequentially through the opening 131 and the light emission surface 12. The second light source 22 corresponds exactly to the second light incident section 112 so that light from the second light source 22 is allowed to enter the light guide plate 1 for subsequent outward emission from the light emission surface 12. The control circuit 3 is electrically connected to the first light source 21 and the second light source 22 to control individual ON/OFF state of the first light source 21 and the second light source 22.

In the instant embodiment, the backlight module 100 provides flexible control of states of brightening or darkening (namely being energized or de-energized) of the first light source 21 and the second light source 22 individually by means of the control circuit 3. Further, the light from the first light source 21 enters the light propagation path 130 to be reflected by the light propagation track 13 for subsequent outward emission, sequentially through the opening 131 and the light emission surface 12 (wherein the area in which the outward emission is conducted is defined as a first light emission section 121); and light from the second light source 22 enters the light guide plate 1 for subsequent outward emission from the light emission surface 12 (wherein the area in which the outward emission is conducted in defined as a second light emission section 122), whereby the light emission surface 12 of the light guide plate 1 may achieve sectionized light emission and the light guide plate 1 allows for optional light emission from the first light emission section 121 and/or the second light emission section 122. Since the light guide plate 1 allows for sectionized light emission, the backlight module 100 may adopt different light emission modes according to actual needs, such that the backlight module 100 may select a localized partial light emission mode or a global complete light emission mode, whereby the application of the backlight module 100 is made more flexible and allows for reduction of energy consumption and thus extension of the life span of the backlight module 100.

Further, the backlight module 100 of the instant embodiment is provided with the light propagation track 13 and the light propagation track 13 circumferentially encloses and delimits the light propagation path 130 and the light propagation track 13 is formed with the opening 131 that faces the light emission surface 12, a major fraction of the light entering the first light incident section 111 propagates in and through the light propagation path 130 for outward emission, by way of the opening 131 of the light propagation track 13, from the first light emission section 121. In other words, the major fraction of the light entering the first light incident section 111 is guided to propagate in a predetermined direction (which is a direction of extension of the light propagation track 13) thereby reducing the percentage of escaping light and increasing light intensity in an area where the light propagation track 13 extends through, meaning brightness of exit light from the first light emission section 121 is increased.

It should be noted, in the instant embodiment, the direction, and length and shape, of extension of the light propagation track 13 can be selected, in a flexible way, according to actual needs. Preferably, according to the needs of a liquid crystal display in which the backlight module 100 is involved, the shape and location of the first light emission section 121 are first determined and then, the light propagation track 13 is designed according to the shape and location of the first light emission section 121 so that the opening 131 of the light propagation track 13 exactly faces the first light emission section 121.

It is appreciated that the opening 131 can be a single, continuous opening, or may alternatively comprise a plurality of sub-openings spaced from each other. In case that the opening 131 comprises a plurality of spaced sub-openings, the light propagation track 13 may still achieve reflection, between adjacent ones of the sub-openings, for light transmitting in the light propagation path 130 so that light may propagate further.

Further, referring collectively to FIGS. 2 and 3, the light propagation track 13 comprises a reflector plate or a reflective coating layer 132. The reflector plate or the reflective coating layer 132 is arranged on one side of the light propagation track 13 that faces the light propagation path 130 to reflect light transmitting in the light propagation path 130 so that light in the light propagation path 130 can be guided to propagate smoothly in the extension direction of the light propagation track 13.

As an optional embodiment, the light propagation track 13 may comprise a track body 133. The track body 133 has a surface facing the light propagation path 130 and provided with a reflector plate attached thereto or coated with a reflective coating layer 132 for reflecting light in the light propagation path 130.

As another optional embodiment, it is also feasible to directly mount at least one reflector plate in the light guide plate 1 and the reflector plate or the reflector plates collectively form the light propagation track 13 for reflection of light in the light propagation path 130 (in this embodiment, no track body as that described in the above embodiment is necessary). It is appreciated that the at least one reflector plate can be an integrated continuous reflector plate or may be alternatively made up of a plurality of separate reflector plates. The plurality of reflector plates may be arranged such that they are jointed to each other or spaced from each other according to actual needs. It is apparent that when the plurality of reflector plates is spaced from each other, the spacing is small.

Further, as an optional embodiment, referring to FIG. 3, the light propagation path 130 is filled with a light guide material. Preferably, the light guide material comprises a substance that is identical to that of the light guide plate 1.

Figure 4:
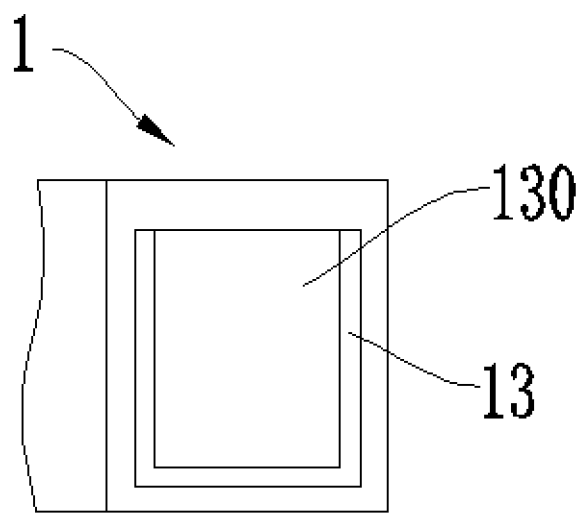
FIG. 4 is a schematic view illustrating a portion of another light guide plate of the backlight module provided according to an embodiment of the present invention.

Certainly, referring to FIG. 4, in another embodiment, the light guide material may comprise a substance different from that of the light guide plate 1. Under this condition, a deep hole is first formed in the light guide plate 1 and the deep hole has a surface to which a reflector plate is attached or a reflective coating layer is coated to form the light propagation track 13 that circumferentially encloses and delimits the light propagation path 130. Afterwards, the light guide material is filled into the light propagation path 130. It should be appreciated that the light propagation path 130 may receive no light guide material filled therein and is instead filled with air to similarly achieve the purpose of propagation of light.

In the instant embodiment, the light guide material is a substance that conducts propagation of light therethrough, such as polystyrene (PS), polycarbonate (PC), and polymethyl methacrylate (PMMA).

Figure 5:
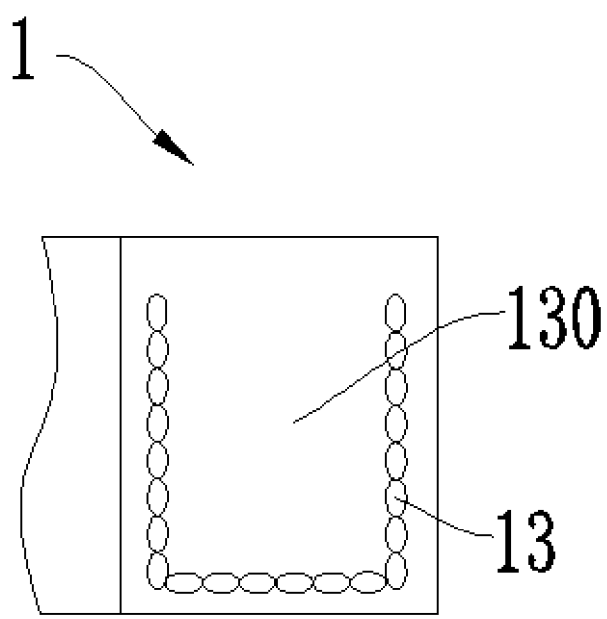
FIG. 5 is a schematic view illustrating a portion of a further light guide plate of the backlight module provided according to an embodiment of the present invention.

Further, as an optional embodiment, referring to FIG. 5, the light propagation path 130 of the light guide plate 1 is filled with a light guide material and the light propagation track 13 comprises an air layer, such that the air layer is arranged on one side of the light propagation track 13 that faces the light propagation path 130 for total internal reflection of the light in the light propagation path 130.

In the instant embodiment, when light travels in the light propagation path 130 and reaches the air layer, due to the difference of refractive index between the light guide material and air, the light is totally reflected so as to achieve the purpose of having light reflected by the light propagation track 13 to be guided for further propagation. Under this condition, a fraction of the light transmitting in the light propagation path 130 is allowed to penetrate through the air layer and project outside the light propagation path 130. Such a fraction of light is minute and would not significantly reduce the brightness of exit light from the first light emission section 121.

As shown in FIG. 5, in the instant embodiment, the air layer comprises a plurality of air bubbles that are tightly adjacent to each other so that such plurality of air bubbles collectively forms the air layer. Certainly, in other embodiments, the air layer can be a single continuous layer of air.

Further, the light propagation track 13 has a cross-sectional configuration in the form of a U-shape, a V-shape, a semicircle, or a channel. Certainly, in other embodiments, the cross-sectional configuration of the light propagation track 13 may be of other shapes. It should be appreciated that in the instant embodiment, the cross-section indicates a plane that is perpendicular to the extension direction of the light propagation track 13.

Figure 6:
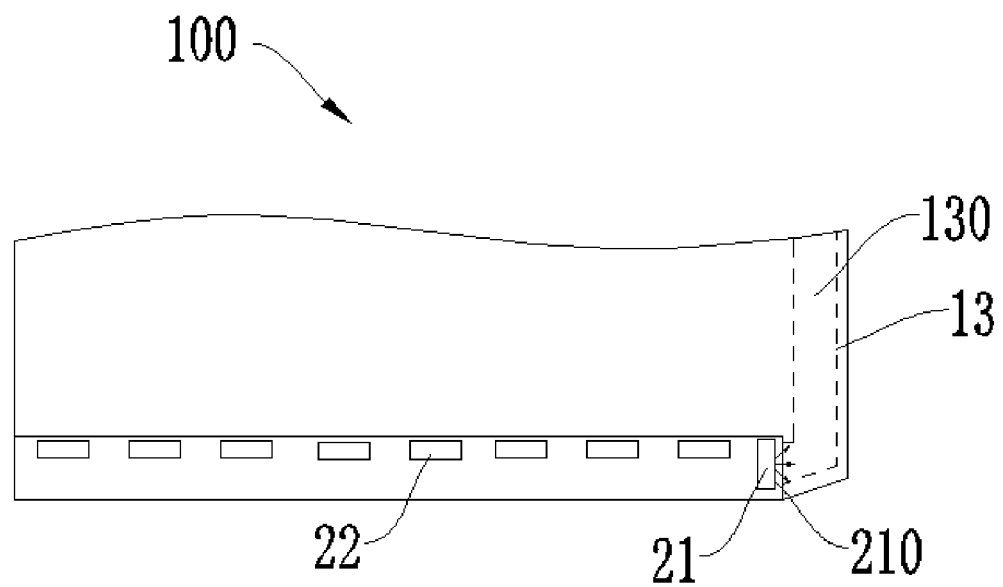
FIG. 6 is a schematic view illustrating another backlight module provided according to an embodiment of the present invention.
Figure 7:
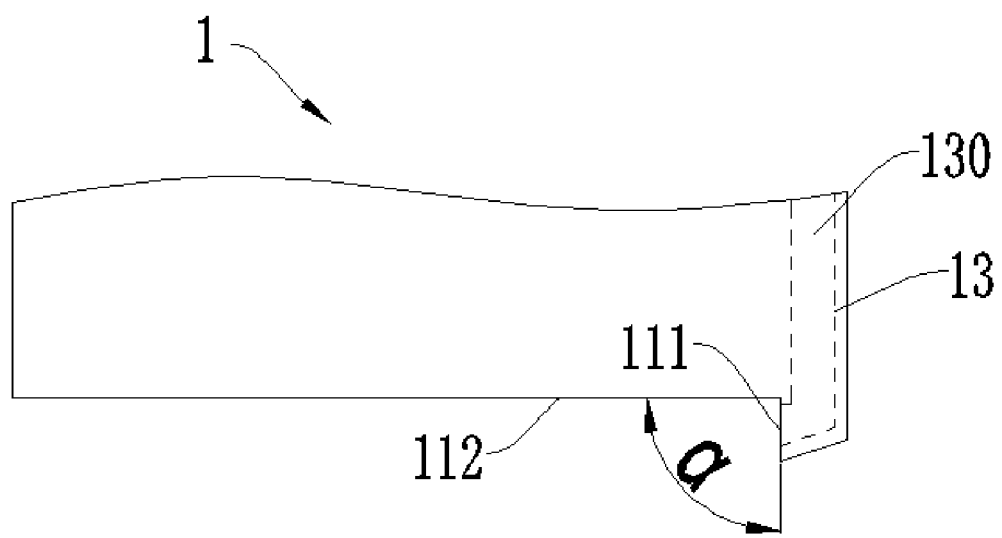
FIG. 7 is a schematic view illustrating a liquid guide plate of said another backlight module provided according to an embodiment of the present invention.

Further, referring collectively to FIGS. 6 and 7, as an optional embodiment, the first light incident section 111 and the second light incident section 112 may define therebetween an angle α that is less than 120°. When the extension direction of the light propagation track 13 is perpendicular to (or substantially perpendicular to) the second light incident section 112, arranging the first light incident section 111 and the second light incident section 112 such that a predetermined angle is formed therebetween would allow the light that enters the first light incident section 111 to be incident into the light propagation track 13 with a grater quantity and in a smoother manner so that light may propagate further in the light propagation path 130 and thus the utilization of the light can be improved.

Further, the first light source 21 has a light projection surface 210 that is arranged parallel to the first light incident section 111 in order to increase percentage of the light getting into the first light incident section 111 from the first light source 21. Preferably, the light projection surface 210 of the first light source 21 is arranged positioned against the first light incident section 111, allowing light from the first light source 21 completely and directly enter the light guide plate 1 so that the first light emission section 121 can be made larger and light would be intense.

For example, referring to FIGS. 6 and 7, the first light incident section 111 is substantially perpendicular to the second light incident section 112 and the light projection surface 210 of the first light source 21 is arranged parallel to the first light incident section 111. Under this condition, the light projection surface 210 of the first light source 21 is also substantially perpendicular to a light projection surface of the second light source 22.

It should be appreciated that in other embodiments, the first light incident section 111 can be made coplanar with the second light incident section 112 and under such a condition, the light propagation track 13 is provided, at a location corresponding to the first light incident section 111, with a light guide structure 134 to enhance light transmitting toward the light propagation track 13. Optionally, the light guide structure 134 can be a rhombus structure, a semicircular structure, or a trapezoidal structure.

Further, as an optional embodiment, referring to FIG. 1, the first light source 21 comprises at least one first sub light source (for example, the first light source 21 shown in FIG. 1 comprises one single first sub light source, meaning reference numeral 21 designating the first sub light source) and the second light source 22 comprises at least two second sub light sources 220; and the first sub light source has a package size that is smaller than a packaging size of the second sub light sources 220, such that light intensity of the first light incident section 111 is less than light intensity of the second light incident section 112. Under this condition, when the first light emission section 121 and the second light emission section 122 are put into displaying at the same time, the light intensity of the first light emission section 121 being weaker than the light intensity of the second light emission section would allow a user to easily distinguish the first light emission section 121 and the second light emission section 122 from each other, making it favorable for diverse applications of the backlight module 100.

Certainly, in other embodiments, when the first light emission section 121 is arranged at an edge of the light guide plate 1, the packaging size of the first sub light sources can be identical to the packaging size of the second sub light sources 220. Since the edge of the light guide plate 1 is often of weaker light intensity, the light intensity of the first light emission section 121 should be also weaker than that of the second light emission section 122.

Further, referring to FIG. 1, as an optional embodiment of the present invention, the control circuit 3 comprises a first solder pad 31 and a second solder pad 32 that are independent of each other. The first light source 21 is electrically connected to the first solder pad 31, and the second light source 22 is electrically connected to the second solder pad 32. Since the first solder pad 31 and the second solder pad 32 are independent of each other, various modes of electrical connection can be achieved for realizing separate or simultaneous energization so that the backlight module 100 may control individual states of the first light source 21 and the second light source 22.

Figure 8:
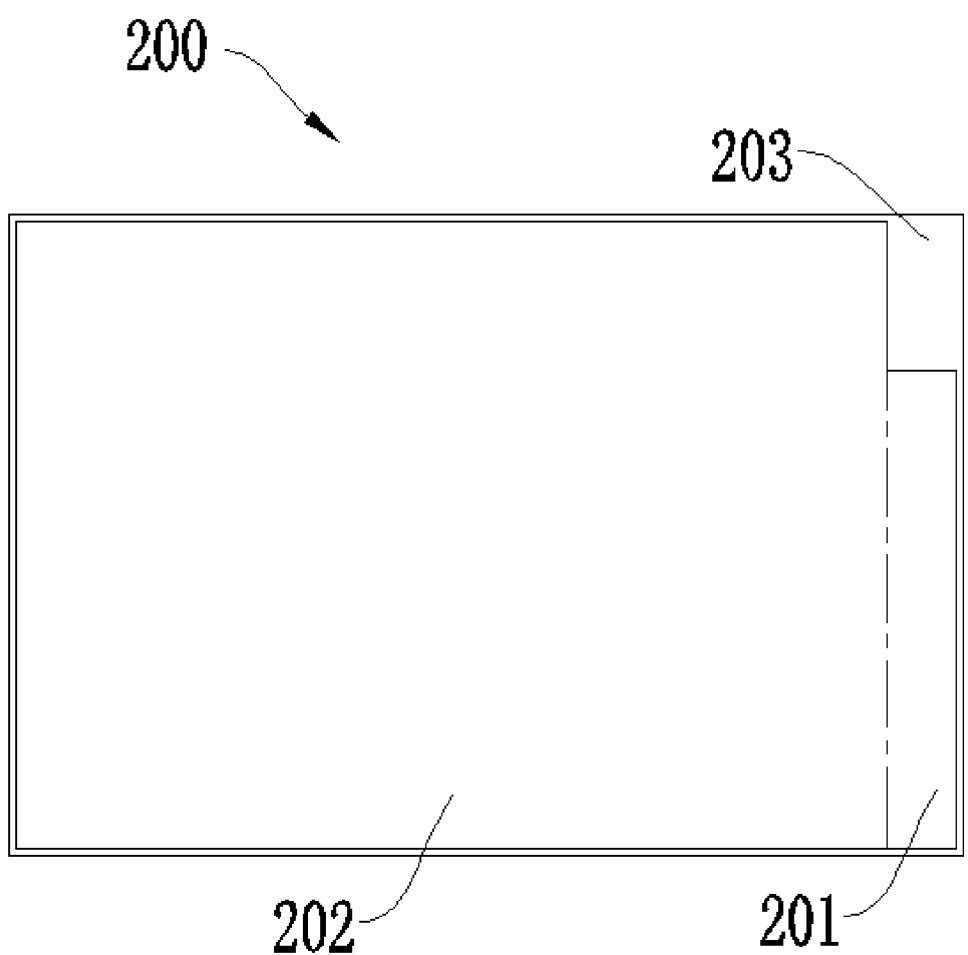
FIG. 8 is a schematic view illustrating display zones of a liquid crystal display panel of a liquid crystal display provided according to an embodiment of the present invention.

Referring to FIGS. 1 and 8, a further embodiment of the present invention provides a liquid crystal display, which comprises the backlight module 100 that was described above and a liquid crystal display panel 200. The liquid crystal display panel 200 comprises a first display zone 201 and a second display zone 202. The first light source 21 supplies backlighting to the first display zone 201 and the second light source 22 supplies backlighting to the second display zone 202.

In the instant embodiment, the first light source 21 and the second light source 22 are mutually independent of each other and thus, the first display zone 201 and the second display zone 202 may realize sectionized displaying, such that the liquid crystal display may selectively use the first display zone 201 and/or the second display zone 202 to display. Since the liquid crystal display is enabled for displaying with different modes according to specific needs, the liquid crystal display is allowed to select a mode of displaying in a part thereof or a mode of displaying in the entirety thereof such that utilization of the liquid crystal display is flexible and power consumption can be reduced. The property of the liquid crystal display for reduced power consumption makes the available service hours and the life span of a power supply device thereof extended.

Further, the backlight module 100 of the instant embodiment is provided with the light propagation track 13, so that a major fraction of the light of the first light source 21 is guided to propagate in the extension direction of the light propagation track 13 for uniform outward emission from the first display zone 201, thereby reducing the percentage of escaping light and increasing light intensity in the first display zone 201.

Further, as an optional embodiment, the second display zone 202 may have a display area that is less than one third of the first display zone 201.

Further, as an optional embodiment, the liquid crystal display panel 200 can be a rectangular panel. The liquid crystal display panel 200 may further comprise a black matrix 203 arranged to circumferentially surround an outer perimeter of the first display zone 201 and the second display zone 202. Through a shape of the black matrix 203 so arranged, in both directions of long sides and short sides of the liquid crystal display panel 200, dimensions or sizes of the second display zone 202 are all less than dimensions or sizes of the first display zone 201. This allows for easy intuitive distinction of the first display zone 201 and the second display zone 202 from each other. Under this condition, the light propagation track 13 may has a length of extension that is substantially identical to the length of the first display zone 201 in the long side direction of the liquid crystal display panel 200.

The above provides a detailed description of an embodiment of the present invention. In the disclosure, reference is made to an example for describing principle and embodiment of the present invention. The illustration of the above embodiment is provided to help understanding of the method and the essential idea of the present invention. Further, based on the idea of the present invention, those having ordinary skills in the field of the art may readily appreciate modifications that can be made in respect of the way of embodiment and the range of application. In brief, the contents disclosed in this specification is not intended to impose undue limitations to the scope of the present invention.

What is claimed is:

1. A backlight module, comprising:
   a light guide plate, which comprises a light incident surface and a light emission surface and also a light propagation track, the light incident surface comprising a first light incident section and a second light incident section adjacent to each other, the light propagation track extending from the first light incident section into interior of the light guide plate and circumferentially enclosing and delimiting a light propagation path, the light propagation track being formed with an opening facing the light emission surface;

a light bar, which comprises a first light source and a second light source, the first light source corresponding exactly to the first light incident section to allow light from the first light source to enter the light propagation path to be reflected by the light propagation track for subsequent outward emission, sequentially through the opening and the light emission surface, the second light source corresponding exactly to the second light incident section to allow light from the second light source to enter the light guide plate for subsequent outward emission from the light emission surface; and a control circuit, which is electrically connected to the first light source and the second light source for controlling ON/OFF states of the first light source and the second light source;

wherein the light propagation track comprises a first material having two portions opposite to and spaced from each other for receiving a second material filled in the spacing between the two portions of the first material, the two portions of the first material being arranged to extend in a predetermined direction of extension to define therebetween the light propagation path extending in the predetermined direction of extension, the second material being disposed along the light propagation path.

2. The backlight module as claimed in claim 1, wherein the light propagation track has one side facing the light propagation path and provided with a reflector plate or a reflective coating layer for reflecting light in the light propagation path.

3. The backlight module as claimed in claim 2, wherein the second material disposed along the light propagation path is comprises air or a light guide material.

4. The backlight module as claimed in claim 1, wherein the second material disposed along the light propagation path comprises a light guide material and the light propagation track has a side facing the light propagation path and provided with an air layer, which conducts total reflection of light in the light propagation path.

5. The backlight module as claimed in claim 1, wherein the light propagation track has a cross-sectional configuration that is in the form of a U-shaped, a V-shaped, a semicircle or a channel.

6. The backlight module as claimed in claim 1, wherein the first light incident section is provided with a light guide structure for guiding light toward the light propagation track.

7. The backlight module as claimed in claim 1, wherein the first light incident section and the second light incident section define therebetween an angle that is less than 120°.

8. The backlight module as claimed in claim 7, wherein the first light source has a light projection surface that is arranged parallel to the first light incident section to increase percentage of light getting into the first light incident section from the first light source.

9. The backlight module as claimed in claim 1, wherein the first light source comprises at least one first sub light source and the second light source comprises at least two second sub light sources, the first sub light sources having a package size smaller than a package size of the second sub light sources so that light intensity of the first light incident section is less than light intensity of the second light incident section.

10. A liquid crystal display, comprising backlight module, which comprises:

a light guide plate, which comprises a light incident surface and a light emission surface and also a light propagation track, the light incident surface comprising a first light incident section and a second light incident section adjacent to each other, the light propagation track extending from the first light incident section into interior of the light guide plate and circumferentially enclosing and delimiting a light propagation path, the light propagation track being formed with an opening facing the light emission surface;

a light bar, which comprises a first light source and a second light source, the first light source corresponding exactly to the first light incident section to allow light from the first light source to enter the light propagation path to be reflected by the light propagation track for subsequent outward emission, sequentially through the opening and the light emission surface, the second light source corresponding exactly to the second light incident section to allow light from the second light source to enter the light guide plate for subsequent outward emission from the light emission surface; and a control circuit, which is electrically connected to the first light source and the second light source for controlling ON/OFF states of the first light source and the second light source;

wherein the light propagation track comprises a first material having two portions opposite to and spaced from each other for receiving a second material filled in the spacing between the two portions of the first material, the two portions of the first material being arranged to extend in a predetermined direction of extension to define therebetween the light propagation path extending in the predetermined direction of extension.

11. The liquid crystal display as claimed in claim 10, wherein the light propagation track has one side facing the light propagation path and provided with a reflector plate or a reflective coating layer for reflecting light in the light propagation path.

12. The liquid crystal display as claimed in claim 11, wherein the second material disposed along the light propagation path is comprises air or a light guide material.

13. The liquid crystal display as claimed in claim 10, wherein the second material disposed along the light propagation path comprises a light guide material and the light propagation track has a side facing the light propagation path and provided with an air layer, which conducts total reflection of light in the light propagation path.

14. The liquid crystal display as claimed in claim 10, wherein the light propagation track has a cross-sectional configuration that is in the form of a U-shaped, a V-shaped, a semicircle or a channel.

15. The liquid crystal display as claimed in claim 10, wherein the first light incident section is provided with a light guide structure for guiding light toward the light propagation track.

16. The liquid crystal display as claimed in claim 10, wherein the first light incident section and the second light incident section define therebetween an angle that is less than 120°.

17. The liquid crystal display as claimed in claim 16, wherein the first light source has a light projection surface that is arranged parallel to the first light incident section to increase percentage of light getting into the first light incident section from the first light source.

18. The liquid crystal display as claimed in claim 10, wherein the first light source comprises at least one first sub light source and the second light source comprises at least two second sub light sources, the first sub light sources having a package size smaller than a package size of the second sub light sources so that light intensity of the first light incident section is less than light intensity of the second light incident section.

* * * * *